United States Patent
Nilsson

(10) Patent No.: US 10,449,487 B2
(45) Date of Patent: Oct. 22, 2019

(54) MERCURY CONTROL IN A SEAWATER FLUE GAS DESULFURIZATION SYSTEM

(71) Applicant: General Electric Technology GmbH, Baden (CH)

(72) Inventor: Peter Lars Nilsson, Vaxjo (SE)

(73) Assignee: GENERAL ELECTRIC TECHNOLOGY GMBH, Baden (CH)

(*) Notice: Subject to any disclaimer, the term of this patent is extended or adjusted under 35 U.S.C. 154(b) by 0 days.

(21) Appl. No.: 15/754,595

(22) PCT Filed: Sep. 14, 2016

(86) PCT No.: PCT/EP2016/071678
§ 371 (c)(1),
(2) Date: Feb. 23, 2018

(87) PCT Pub. No.: WO2017/046155
PCT Pub. Date: Mar. 23, 2017

(65) Prior Publication Data
US 2018/0236400 A1    Aug. 23, 2018

(30) Foreign Application Priority Data

Sep. 15, 2015 (EP) ...................... 15185304

(51) Int. Cl.
| B01D 53/34 | (2006.01) |
| B01D 53/50 | (2006.01) |
| B01D 53/64 | (2006.01) |
| F23J 15/04 | (2006.01) |
| B01D 53/30 | (2006.01) |

(52) U.S. Cl.
CPC ......... B01D 53/346 (2013.01); B01D 53/507 (2013.01); B01D 53/64 (2013.01); F23J 15/04 (2013.01); *B01D 53/30* (2013.01); *B01D 2251/102* (2013.01); *B01D 2252/1035* (2013.01); *B01D 2257/602* (2013.01); *B01D 2258/0283* (2013.01)

(58) Field of Classification Search
CPC ........ B01D 53/50; B01D 53/64; B01D 53/78; B01D 53/8669; B01D 53/8665; B01D 2257/302; B01D 2257/602; B01D 2258/0283; B01J 10/00; B01J 19/00; B01J 19/002; B01J 2219/00042; B01J 2219/00245; C02F 2103/06; F23J 15/04
See application file for complete search history.

(56) References Cited

U.S. PATENT DOCUMENTS

| 7,524,473 B2 | 4/2009 | Lindau et al. |
| 8,828,341 B1 | 9/2014 | Appelo et al. |
| 2013/0180923 A1 | 7/2013 | Keiser et al. |

FOREIGN PATENT DOCUMENTS

| EP | 2 556 879 A1 | 2/2013 |
| EP | 2 578 544 A1 | 4/2013 |
| EP | 2 579 032 A1 | 4/2013 |
| JP | 2014217809 A1 | 11/2014 |
| WO | 98/16301 A1 | 4/1998 |
| WO | 2013/050990 A1 | 4/2013 |
| WO | WO 2013 176018 A1 * | 11/2013 ............ C02F 1/4674 |

OTHER PUBLICATIONS

Extended European Search Report and Opinion issued in connection with corresponding EP Application No. 15185304.1 dated Feb. 18, 2016.
International Search Report and Written Opinion issued in connection with corresponding PCT Application No. PCT/EP2016/071678 dated Nov. 18, 2016.
International Preliminary Report on Patentability issued in connection with corresponding PCT Application No. PCT/EP2016/071678 dated Mar. 20, 2018.

* cited by examiner

*Primary Examiner* — Timothy C Vanoy

(74) *Attorney, Agent, or Firm* — Grogan, Tuccillo & Vanderleeden, LLP

(57) ABSTRACT

A method for controlling mercury release, emission and/or re-emission levels in a treated flue gas and a seawater effluent waste stream through control of a sulphite concentration within a seawater scrubber system is disclosed. One method for controlling mercury release, emission and re-emission levels through control of sulphite concentration is to measure the sulphite concentration of seawater entering a seawater scrubber system and comparing the same to a predetermined sulphite concentration value. If the comparison reveals the measured sulphite concentration is above the predetermined sulphite concentration values, the amount of fresh seawater and/or oxidation air supplied to the seawater scrubber system is increased. If the comparison reveals the measured sulphite concentration is below the predetermined sulphite concentration values, the amount of fresh seawater and oxidation air supplied to the seawater scrubber system is decreased.

14 Claims, 1 Drawing Sheet

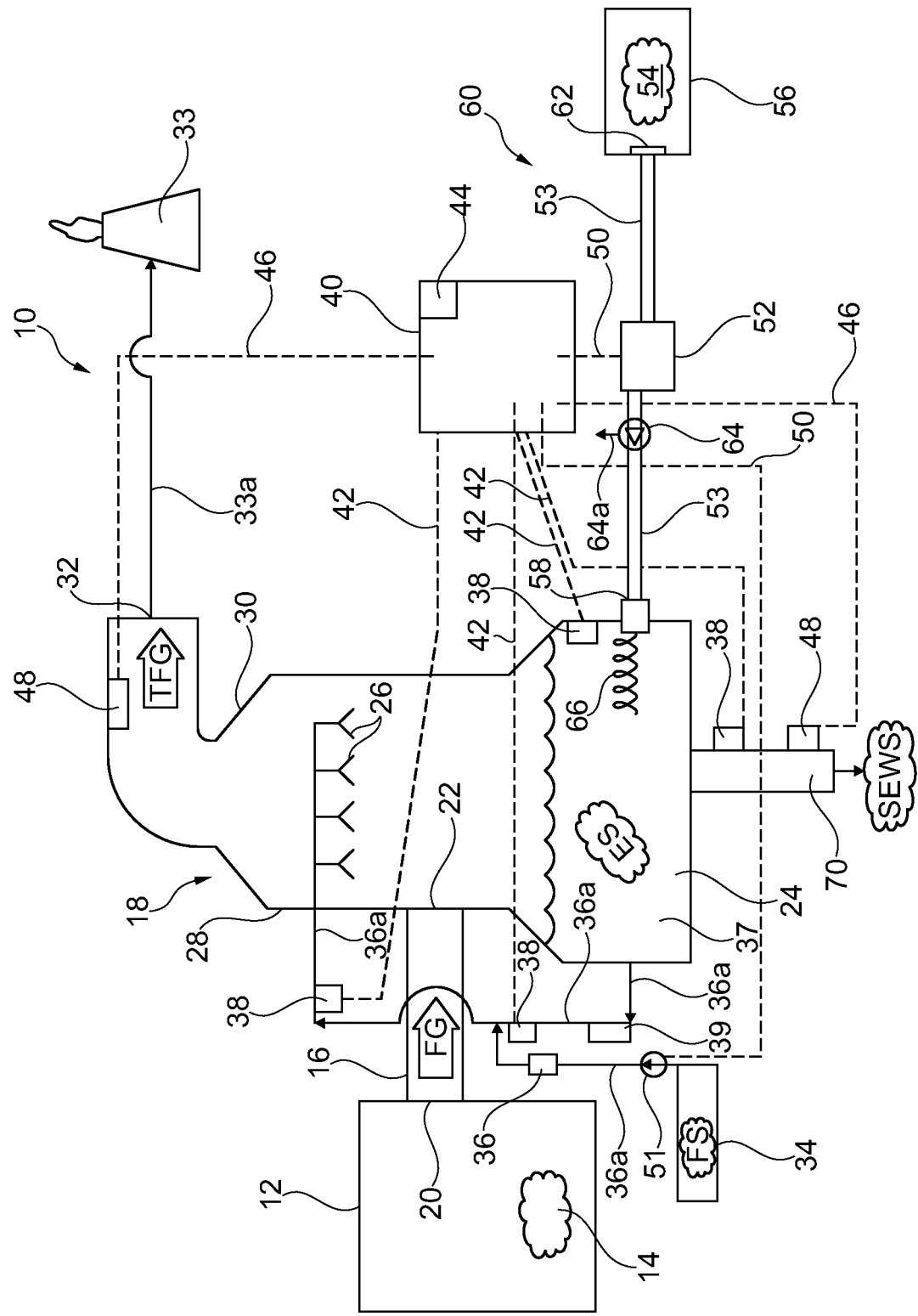

MERCURY CONTROL IN A SEAWATER FLUE GAS DESULFURIZATION SYSTEM

TECHNOLOGY FIELD

The subject disclosure generally relates to controlling amounts of mercury releases or emissions to an environment incident to combustion of a fuel source containing mercury or mercury compounds, and more specifically to controlling amounts of mercury emissions and re-emissions in a treated combustion flue gas and controlling amounts of mercury released in a seawater effluent waste stream from a seawater scrubbing operation.

BACKGROUND

Combustion of fuel sources such as coal produces a waste gas, referred to as "flue gas" that is to be emitted into an environment, such as the atmosphere. The fuel sources typically contain sulfur and sulfur compounds which are converted in the combustion process to gaseous species, including sulfur oxides, which then exist as such in the resulting flue gas. The fuel sources typically also contain elemental mercury or mercury compounds which are converted in the combustion process to, and exist in the flue gas as, gaseous elemental mercury or gaseous ionic mercury species.

As such, flue gas contains particles, acid gases, noxious substances and other impurities considered to be environmental contaminants. Prior to emission into the atmosphere via a smoke stack, hereinafter a "stack", the flue gas undergoes a cleansing or treatment process. In coal combustion, one aspect of this treatment process is normally desulfurization, such as a wet scrubbing operation commonly known as wet flue gas desulfurization (WFGD).

Sulfur oxides are commonly removed from flue gas using a WFGD system by introducing an aqueous alkaline slurry to a scrubber tower of the WFGD system. The aqueous alkaline slurry typically includes a basic material that will interact with contaminants to remove the contaminants from the flue gas. Examples of basic materials that are useful in the aqueous alkaline slurry include lime, limestone, magnesium, combinations thereof, and the like.

Recently, there has been an increased focus on the removal of mercury from flue gas. Presently, there are various known methods for removing mercury from combustion flue gas. Those methods include addition of oxidizing agents into a boiler upstream of a flue gas emission control system prior to removing the oxidizing/oxidized agents with scrubbers, addition of reactants to bind mercury and removing the same from the flue gas, and utilization of particular coal or fuel to minimize the amount of mercury released when the coal or fuel is burned.

A number of generally known methods of mercury removal are effective to produce mercury salts, which can then be dissolved and removed by an aqueous alkaline slurry used in a wet scrubbing operation. Some of these methods include the addition of halogen or halogen compounds, such as bromine, to the coal or to the flue gas upstream of the wet scrubbing operation to provide oxidation of elemental mercury to ionic mercury and to form mercury salts, which are then dissolved in an aqueous alkaline slurry incident to the sulfur oxide removal processes. However, the removal of mercury in the aqueous alkaline slurry of a wet scrubber, or in a less typical seawater scrubber, has proven to be difficult to control. Further, efficiency is not easily predicted when designing a flue gas cleaning system with respect to mercury removal. The desired emission guarantee levels are often as low as 0.3 µg/Nm³ of mercury, which corresponds to a very high mercury removal efficiency for a flue gas treatment system.

SUMMARY

One aspect of the subject disclosure relates to a method for controlling a seawater scrubber system for mercury control when treating a combustion flue gas generated by combustion of a fuel source to reduce mercury release, emission and/or re-emission to an environment such as the atmosphere or the ocean. The method includes subjecting the combustion flue gas to a controlled seawater scrubbing operation to control amounts of sulfur oxides and mercury present in the produced treated flue gas. The controlled seawater scrubbing operation comprises contacting the combustion flue gas with seawater controlled to have a sufficiently high sulphite level for effective reduction of $Hg^{2+}$ to $Hg^0$ therein. As such, a predetermined amount of unreduced $Hg^{2+}$ remains in the produced effluent seawater, and a predetermined amount of the resultant $Hg^0$ enters or is re-emitted into the treated flue gas for release into the environment or atmosphere via a stack. Hence, Hg levels present in the flue gas from fuel combustion are balanced between an amount of mercury present in the effluent seawater and an amount of mercury present in the treated flue gas. Currently, some regulations are more stringent with regard to amounts of mercury or mercury levels present in seawater effluent waste streams, than amounts of mercury or mercury levels present in treated flue gas streams. By controlling the seawater scrubbing operation, the amount of mercury or mercury level present in the fuel combustion produced flue gas may be divided between the seawater effluent waste stream and the treated flue gas stream for regulatory compliance of each. $Hg^{2+}$ in the seawater effluent waste stream is considered a local pollutant and regulated accordingly. $Hg^0$ in the treated flue gas has a very long residence time in the air, i.e., about 6 to about 24 months. As such, $Hg^0$ in the treated flue gas is considered a global pollutant and regulated as such. Controlling the seawater scrubbing operation according to the subject disclosure enables amounts of mercury or mercury levels present in combustion flue gas to be divided between the seawater effluent waste stream and the treated flue gas stream for regulatory compliance of each.

Using a sulphite sensor, such as that disclosed in WO2013/050990 and incorporated herein in its entirety by reference, sulphite concentration measurements are obtained from seawater flowing into the seawater scrubber system or from the produced effluent seawater. These sulphite concentration measurements are used as a basis for adjusting an amount of fresh seawater supplied to the seawater scrubber system. Adjusting an amount of fresh seawater supplied to the seawater scrubber system modifies the system's sulphite level due to the change in the amount of total seawater in the system, or modifies the system's oxidation stoichiometry. As such, the seawater scrubber system's sulphite concentration is controlled to achieve the predetermined amount of mercury or mercury level in the treated flue gas, and to achieve the predetermined amount of mercury or mercury level in the seawater effluent waste stream with relatively low operating costs, and without jeopardizing sulphur emission requirements. Lindau, U.S. Pat. No. 7,524,473 incorporated herein in its entirety by reference, obtained mercury emission reductions by altering oxidation air to control oxidation reduction potential, and thus indirectly controlled sulphite concentration. The subject invention as disclosed herein is an improvement over Lindau in that oxidation reduction potential can be altered by other parameters, such as dissolved salt concentrations, which produce different readings at similar sulphite concentrations.

BRIEF DESCRIPTION OF THE DRAWINGS

Illustrating the subject matter disclosed herein, the subject drawing is of an embodiment presently preferred. However, it should be understood that the disclosed subject matter is not limited to the precise arrangements and instrumentalities shown in this drawing, wherein:

FIG. 1 is a schematic representation of a system for controlling a seawater scrubber system to achieve a predetermined level of mercury in a treated flue gas and to achieve a predetermined level of mercury in a seawater effluent waste stream for regulatory compliance of each.

DETAILED DESCRIPTION

By using a sulphite probe 38, such as that disclosed in WO2013/050990 incorporated herein in its entirety by reference, sulphite concentrations of seawater supplied to a seawater scrubber system 18 for seawater flue gas desulphurization (SWFGD) can be measured and controlled for purposes of controlling levels of mercury release, emission and/or re-emission to the environment, such as to the atmosphere or to the ocean 34. In the subject seawater scrubber system 18, seawater salts are used to absorb acid gases, such as sulphur oxides present in the flue gas FG. The seawater so used is collected as effluent seawater for recirculation through the seawater scrubber system 18 so as to reduce operating costs associated therewith. Although more costly, the subject seawater scrubber system 18 may, as an alternative, be operated using only fresh seawater FS for contact with the flue gas FG. In the case of only using fresh seawater FS for contact with the flue gas FG, sulphite concentrations are measured using a sulphite probe 38 arranged in contact with the produced effluent seawater ES. The obtained sulphite concentration measurements are used to control the amount of fresh seawater FS supplied to the seawater scrubber system 18, thereby controlling the sulphite concentration within the seawater scrubber system 18. Hence, controlling the amount of fresh seawater FS added to the seawater scrubber system 18, controls the sulphite concentration within the seawater scrubber system 18, thereby controlling mercury speciation, and thereby controlling mercury release, emission and/or re-emission levels. As such, if it is desired to increase the level of mercury emission/re-emission within the treated flue gas TFG, the supply of fresh seawater FS to the seawater scrubber system 18 is decreased to achieve a higher sulphite concentration and a higher predetermined treated flue gas TFG mercury emission/re-emission level. If it is desired to increase the level of mercury released in the seawater effluent waste stream SEWS, the supply of fresh seawater FS to the seawater scrubber system 18 is increased to achieve a lower sulphite concentration and a higher predetermined mercury level within the seawater effluent waste stream SEWS. By controlling each the amount of mercury released in the seawater effluent waste stream SEWS and the amount of mercury emission and/or re-emission in the treated flue gas TFG, regulatory compliance of each is achieved.

In the case of recirculating effluent seawater through the seawater scrubber system 18, the amount of fresh seawater FS added to the seawater scrubber system 18 is controlled in order to control the sulphite concentration in the recirculated effluent seawater, thereby controlling mercury speciation, and thereby controlling mercury release, emission and/or re-emission levels. As an option, oxidation air 54 may be blown into the recirculated effluent seawater ES as another means of controlling the sulphite concentration therein. Controlling the sulphite concentration in the recirculated effluent seawater ES controls mercury speciation, and thereby controls mercury release, emission and/or re-emission levels. If it is desired to increase the level of mercury emission/re-emission within the treated flue gas TFG, the supply of fresh seawater FS and/or oxidation air 54 is controlled to provide a lesser amount thereof to achieve a higher sulphite concentration and a higher predetermined treated flue gas TFG mercury emission/re-emission level. If it is desired to increase the level of mercury released in the seawater effluent waste stream SEWS, the supply of fresh seawater FS and/or oxidation air 54 is controlled to provide a greater amount to achieve a lower sulphite concentration and a higher predetermined mercury level within the seawater effluent waste stream SEWS.

Referring now to FIG. 1, one embodiment of the subject system 10 is illustrated. System 10 comprises a boiler 12 for the combustion of a carbonaceous fuel 14, such as but not limited to coal. Combustion of the carbonaceous fuel 14 produces a flue gas FG comprising acid gases such as sulphur oxides, gaseous heavy metals such as mercury, particulates and the like, hereafter referred to collectively as contaminants. The flue gas FG flows from outlet 20 of boiler 12 through fluidly connected duct 16 and into inlet 22 of fluidly connected seawater scrubber system 18 for seawater flue gas desulphurization SWFGD. Optionally, additional equipment systems known to those skilled in the art may be arranged between boiler 12 and seawater scrubber system 18, but are not described herein for purposes of clarity.

Once inside seawater scrubber system 18, the flue gas FG flows vertically upward therein coming into direct contact with seawater flowing vertically downward therein for seawater salt absorption of contaminants in the flue gas FG. While seawater scrubber system 18 is described herein as a spray-type scrubber tower for purposes of clarity, other types of seawater scrubber systems known to those skilled in the art are equally suitable. Within seawater scrubber system 18, seawater is introduced through one or more openings or nozzles 26 in an upper portion 28 of a scrubber tower 30. As noted above, seawater absorbs contaminants such as sulphur oxides from flue gas FG for seawater flue gas desulphurization SWFGD. Removal of mercury salts is incident to this seawater flue gas desulphurization SWFGD process. Removal of such contaminants from flue gas FG produces treated flue gas TFG. Treated flue gas TFG flows out from seawater scrubber system 18 through outlet 32. From outlet 32, treated flue gas TFG may flow to a fluidly connected stack 33 via fluidly connected duct 33a for release to the environment such as the atmosphere, or to other emissions control apparatus (not shown).

Seawater is transported to nozzles 26 from fluidly connected fresh seawater source 34 such as an ocean via fluidly connected piping 36a and pump 36. The amount of fresh seawater FS transported to nozzles 26 depends upon several factors such as but not limited to the amount of flue gas FG present in the scrubber tower 30, the amount of contaminants in the flue gas FG, and/or the design of the seawater scrubber system 18. After the seawater directly contacts the flue gas FG and absorbs contaminants therefrom, the so produced effluent seawater ES is collected in collecting tank 37 in a bottom 24 of scrubber tower 30. The seawater scrubber system 18 may recirculate the collected effluent seawater ES to nozzles 26 via piping 36a and pump 39, with or without an amount of fresh seawater FS from seawater source 34 added thereto. As an alternative, seawater scrubber system 18 may be used as a "once through" system with only fresh seawater FS supplied to nozzles 26 for contact with the flue gas FG flowing therethrough as described above. In the case of using seawater scrubber system 18 as a once through system, produced effluent seawater ES is a seawater effluent waste stream SEWS discharged from the seawater scrubber system 18 via outlet 70.

To control mercury release, emission and/or re-emission from the scrubber tower 30 when recirculating effluent seawater ES, one or more sulphite sensors 38 are arranged in piping 36a in direct contact with the seawater supplied to nozzles 26 in scrubber tower 30. Sulphite sensors 38 measure the sulphite concentration of the seawater dispersed within scrubber tower 30. Sulphite sensors 38 may measure seawater sulphite concentrations either continuously or at predetermined intervals. For example, predetermined intervals for sulphite concentration measurement may be determined automatically by a control device 40 in communication with the sulphite sensors 38, or manually by a user. Likewise, as an option, sulphite sensors 38 may be arranged in contact with effluent seawater ES in scrubber tower 30 or in a downstream location so as to measure sulphite concentrations thereof.

Sulphite concentrations measured by sulphite sensors 38 are sent as a signal 42 indicative of the measured sulphite concentration(s) to control device 40. Control device 40 may include for example but not limited to a computer, a microprocessor, an application specific integrated circuit, circuitry, or any other device capable of transmitting and receiving electrical signals from various sources, at least temporarily storing data indicated by such signals 42, and performing mathematical and/or logical operations on the data indicated by such signals 42. Control device 40 may include or be connected to a monitor, a keyboard, or other user interface, and includes an associated memory device 44.

Control device 40 compares the measured sulphite concentration(s) to one or more predetermined sulphite concentration values as a set point, which may be stored in memory device 44. It is contemplated that the one or more predetermined sulphite concentration potential values may comprise a single value or a range of values. The predetermined value(s) may be a user-input parameter. For example, the predetermined sulphite concentration values may be from about 300 mg/l to about 500 mg/l or from about 25 mg/l and about 150 mg/l. By "predetermined" it is simply meant that the value is determined before the comparison is made with the actual measured sulphite concentration(s) as measured by the sulphite sensors 38.

Comparison of the measured sulphite concentration to the one or more predetermined sulphite concentration values causes control device 40 to provide a control signal 50 to a seawater supply valve 51 and/or a blower 52. Seawater supply valve 51 adjusts an amount of fresh seawater introduced from fluidly connected seawater source 34 into scrubber tower 30 via nozzles 26 in response to control signal 50. Adjusting the amount of fresh seawater introduced to fluidly connected scrubber tower 30 via nozzles 26 adjusts the sulphite concentration of the seawater dispersed within in scrubber tower 30 for direct contact with flue gas FG. Optionally, a blower 52 may be used to adjust an amount of oxidation air 54, such as oxygen containing gas, introduced via fluidly connected piping 53 from fluidly connected oxidation air source 56 into the effluent seawater ES collected in fluidly connected collection tank 37 in response to control signal 50. Oxidation air 54 can be any gas that contains any amount of oxygen, for example but not limited to air, which can be used as the oxygen containing gas. Adjusting the amount of oxidation air 54 introduced to fluidly connected collecting tank 37 adjusts the sulphite concentration of the effluent seawater ES present in collecting tank 37.

For example, if the comparison of the measured sulphite concentration and the predetermined sulphite concentration values reveals that the measured sulphite concentration is greater than the predetermined sulphite concentration values, control device 40 may provide a control signal 50 to the seawater supply valve 51. Seawater supply valve 51 thereby adjusts to increase the amount of fresh seawater FS introduced from fluidly connected seawater source 34 into scrubber tower 30 via nozzles 26 in response to control signal 50. Conversely, if the comparison reveals that the measured sulphite concentration is lower than the predetermined sulphite concentration values, control device 40 may provide a control signal 50 to the seawater supply valve 51. Seawater supply valve 51 thereby adjusts to decrease the amount of fresh seawater FS introduced from fluidly connected seawater source 34 into scrubber tower 30 via nozzles 26 in response to control signal 50. As such, it is possible to control levels of mercury emission and/or re-emission present within the treated flue gas TFG released to the environment via stack 33, and to control levels of mercury present in the seawater effluent waste stream SEWS released through outlet 70, while minimizing fresh seawater FS consumption/effluent seawater ES production. It is contemplated that control device 40 may employ known control algorithms, e.g., proportional, integral, and/or derivative control algorithms, to adjust control signal 50 in response to the comparison of the measured sulphite concentration and the predetermined sulphite concentration values.

For a further example, as an option, if the comparison of the measured sulphite concentration and the predetermined sulphite concentration values reveals that the measured sulphite concentration is greater than the predetermined sulphite concentration values, control device 40 may provide a control signal 50 to the blower 52 to cause the blower 52 to increase the amount of oxidation air 54 introduced into collecting tank 37 through input 58. Conversely, if the comparison reveals that the measured sulphite concentration is lower than the predetermined sulphite concentration values, control device 40 may provide a control signal 50 to the blower 52 to cause the blower 52 to decrease the amount of oxidation air 54 introduced into collecting tank 37 through input 58. As such, it is possible to control levels of mercury emissions and/or re-emissions in the treated flue gas released via stack 33 to the environment, and to control levels of mercury present in the seawater effluent waste stream SEWS released through outlet 70, while minimizing oxidation air 54 consumption. It is contemplated that control device 40 may employ known control algorithms, e.g., proportional, integral, and/or derivative control algorithms, to adjust control signal 50 in response to the comparison of the measured sulphite concentration and the predetermined sulphite concentration values.

As an option, a mercury measurement device 48 may be used in the subject seawater scrubber system 18 to measure mercury release levels and/or mercury emission/re-emission levels. Mercury measurement device 48 is any device suitable to measure mercury release levels in a seawater effluent waste stream SEWS and/or mercury emission/re-emission levels in a treated flue gas TFG, from scrubber tower 30. Examples include but are not limited to continuous emission monitors (CEMs), such as cold-vapor atomic absorption spectrometry (CVAAS), cold-vapor atomic fluorescence spectrometry (CVAFS), in-situ ultraviolet differential optical absorption spectroscopy (UVDOAS), and atomic emission spectrometry (AES). As such, mercury measurement devices 48 measure mercury levels in the treated flue gas TFG and the seawater effluent waste stream SEWS to obtain mercury measurements. The mercury measurements from the mercury measurement devices 48 are sent to control device 40 as an electronic signal 46. Measured mercury levels may be used in control device 40 in combination with sulphite concentration measurements for adjustment and control of one or more of the seawater scrubber system 18 operating parameters. As an example, measured mercury levels are sent by one or more mercury measurement devices 48 to control device 40 as an electronic signal 46 for comparison with predetermined mercury concentration values and/or correlated predetermined sulfite concentration values. Based on the comparison, control device 40 may provide a control signal 50 to the seawater supply valve 51 and/or the blower 52. Seawater supply valve 51 thereby adjusts the amount of fresh seawater FS introduced from fluidly connected seawater source 34 into scrubber tower 30 via nozzles 26 in response to control signal 50. Likewise, the blower 52 thereby adjusts the amount of oxidation air 54 introduced from fluidly connected oxidation air source 56 into scrubber tower 30 via input 58 in response to control signal 50. By such adjustments to the amount of fresh seawater FS and/or oxidation air 54 introduced to the seawater scrubber system 18, the seawater scrubber system 18 and hence the mercury present therein can be controlled to achieve desired mercury levels in each the produced treated flue gas TFG and the produced seawater effluent waste stream SEWS for regulatory compliance of each.

For example, if the comparison of the measured mercury concentration and the predetermined mercury concentration values reveals that the measured mercury concentration is greater than predetermined mercury concentration values stored in memory device 44 of control device 40, control device 40 may provide a control signal 50 to the seawater supply valve 51. Seawater supply valve 51 thereby adjusts to increase the amount of fresh seawater FS introduced from fluidly connected seawater source 34 into scrubber tower 30 via nozzles 26 in response to control signal 50 for sulphite concentration adjustment. Conversely, if the comparison reveals that the measured mercury concentration is lower than the predetermined mercury concentration values stored in memory device 44 of control device 40, control device 40 may provide a control signal 50 to the seawater supply valve 51. Seawater supply valve 51 thereby adjusts to decrease the amount of fresh seawater FS introduced from fluidly connected seawater source 34 into scrubber tower 30 via nozzles 26 in response to control signal 50 for sulphite concentration adjustment. As such, it is possible to control levels of mercury emission and/or re-emission present in the treated flue gas TFG released via stack 33, and to control levels of mercury in the seawater effluent waste stream SEWS released though outlet 70, while minimizing fresh seawater FS consumption/effluent seawater ES production. It is contemplated that control device 40 may employ known control algorithms, e.g., proportional, integral, and/or derivative control algorithms, to adjust control signal 50 in response to the comparison of the measured mercury concentration and the predetermined mercury concentration values.

For a further example, as an option, if the comparison of the measured mercury concentration and the predetermined mercury concentration values reveals that the measured mercury concentration is greater than the predetermined mercury concentration values, control device 40 may provide a control signal 50 to the blower 52 to cause the blower 52 to increase the amount of oxidation air 54 introduced into collecting tank 37 through input 58 for sulphite concentration adjustment. Conversely, if the comparison reveals that the measured mercury concentration is lower than the predetermined mercury concentration values, control device 40 may provide a control signal 50 to the blower 52 to cause the blower 52 to decrease the amount of oxidation air 54 introduced into collecting tank 37 through input 58 for sulphite concentration adjustment. As such, it is possible to control mercury emission and/or re-emission levels present in the treated flue gas TFG released via stack 33, and to control levels of mercury present in the seawater effluent waste stream SEWS released via outlet 70, while minimizing oxidation air 54 consumption. It is contemplated that control device 40 may employ known control algorithms, e.g., proportional, integral, and/or derivative control algorithms, to adjust control signal 50 in response to the comparison of the measured mercury concentration and the predetermined mercury concentration values.

Blower 52 may be of any suitable type capable of introducing varying amounts of oxidation air 54 to effluent seawater ES in collecting tank 37. As illustrated in FIG. 1, forced oxidation system 60 includes an inlet vane 62 which operates to regulate the amount of oxidation air 54 entering blower 52 from oxidation air source 56 in response to control signal 50 from control device 40. While the inlet vane 62 is a suitable device for regulating the amount of oxidation air 54 supplied to collecting tank 37, other types of devices and methods could be employed, such as a valve 64 downstream of the blower 52, discharging some air to the atmosphere via pipe 64a, or by controlling the speed of the blower 52. Additionally, force oxidation system 60 may be connected to an agitator 66 in collecting tank 37 to distribute oxidation air 54 throughout the collected effluent seawater ES.

One method for using system 10 illustrated in FIG. 1 is to supply combustion flue gas FG to a scrubber tower 30 of a seawater scrubber system 18 for direct contact of the flue gas FG flowing therethrough with seawater for removal of contaminants from the flue gas FG. This method comprises measuring a sulphite concentration in the seawater scrubber system 18 using one or more sulphite sensors 38 for comparison to a predetermined sulphite concentration value, and adjusting an amount of fresh seawater FS and/or oxidation air supplied to the seawater scrubber system 18 to increase or decrease sulphite concentration to control mercury release, emission and/or re-emission levels in the produced treated flue gas TFG and the produced seawater effluent waste stream SEWS for regulatory compliance of each.

Another method for using system 10 illustrated in FIG. 1 is to supply combustion flue gas FG to the seawater scrubber system 18 for direct contact with seawater for removal of contaminants from the flue gas FG, measuring a sulphite concentration in the seawater entering the seawater scrubber system 18 using one or more sulphite sensors 38 for comparison to a predetermined sulphite concentration value, and adjusting one or more seawater scrubber system 18 parameters to increase or decrease sulphite concentration to control mercury release, emission and/or re-emission levels in produced treated flue gas TFG and produced seawater effluent waste stream SEWS for regulatory compliance of each.

Another method for using system 10 illustrated in FIG. 1 is to supply combustion flue gas FG to the seawater scrubber system 18 for direct contact with seawater for removal of contaminants from the flue gas FG, measuring a mercury concentration in the seawater scrubber system 18 using one or more mercury sensors 48 for comparison to a predetermined mercury concentration value and/or a correlated predetermined sulphite concentration value, and adjusting one or more seawater scrubber system 18 sulphite concentration parameters to control mercury release, emission and/or re-emission levels in produced treated flue gas TFG and produced seawater effluent waste stream SEWS for regulatory compliance of each.

Although the subject disclosure has been described and illustrated with respect to exemplary embodiments thereof, it is understood by those skilled in the art that the foregoing and various other changes, omissions and additions may be made therein and thereto to the disclosed method and system.

What is claimed is:

1. A method for controlling mercury release, emission and re-emission levels in a treated combustion flue gas and a seawater effluent waste stream comprising:
   supplying a combustion flue gas to a seawater scrubber system for direct contact with seawater for removal of contaminants from the flue gas to produce a treated flue gas and a seawater effluent waste stream;
   measuring a sulphite concentration in the seawater entering a scrubber tower of the seawater scrubber system and in the produced effluent seawater for comparison to a predetermined sulphite concentration value; and
   adjusting one or more seawater scrubber system parameters to increase or decrease sulphite concentration to control levels of mercury release, emission and re-emission in each the produced treated flue gas and the seawater effluent waste stream.

2. The method according to claim 1, wherein the sulphite concentration is measured in the produced effluent seawater.

3. The method according to claim 1, further comprising:
   measuring a mercury concentration in the seawater scrubber system for comparison to a predetermined mercury concentration value or a correlated predetermined sulphite concentration value; and
   adjusting one or more seawater scrubber system parameters to increase or decrease sulphite concentration to control mercury release, emission and re-emission in the produced treated flue gas and seawater effluent waste stream based on the mercury concentration measured.

4. The method according to claim 1, further comprising:
   supplying an amount of an oxidation air to seawater effluent collected in the seawater scrubber system to adjust the sulphite concentration in the seawater dispersed by nozzles within the seawater scrubber system to control levels of mercury release, emission and/or re-emission in each the produced treated flue gas and the seawater effluent waste stream.

5. The method according to claim 1, wherein the sulphite concentration is measured using one or more sulphite sensors.

6. The method according to claim 1, wherein adjusting one or more seawater scrubber system parameters comprises adjusting fresh seawater supply, adjusting oxidation air supply, or adjusting both fresh seawater and oxidation air supply, to the seawater scrubber system.

7. A system for controlling mercury release, emission and re-emission levels in both a treated combustion flue gas and a seawater effluent waste stream comprising:
   a seawater scrubber system with seawater dispersal for direct contact with a combustion flue gas flowing therethrough; a collection tank for collecting effluent seawater produced by direct contact with the combustion flue gas;
   one or more sulphite sensors arranged in contact with seawater entering a scrubber tower of the seawater scrubber system for dispersal therein and in the produced effluent seawater, for measuring a sulphite concentration in the seawater to obtain a measured sulphite concentration;
   a control device to compare the measured sulphite concentration to a predetermined sulphite concentration value and based thereon control a device; and
   a device controlled by the control device for adjusting a seawater scrubber system parameter to increase or decrease sulphite concentration to control levels of mercury release, emission and/or re-emission in each the produced treated flue gas and the seawater effluent waste stream.

8. The system of claim 7, further comprising: one or more mercury sensors in an outlet of the seawater scrubber system for measuring a mercury concentration to obtain a measured mercury concentration.

9. The system of claim 7, further comprising:
   one or more mercury sensors in an outlet of the seawater scrubber system for measuring a mercury concentration to obtain a measured mercury concentration; a control device to compare the measured mercury concentration to a predetermined mercury concentration value or a correlated predetermined sulphite concentration value and based thereon control a device; and
   a device controlled by the control device for adjusting a seawater scrubber system parameter to increase or decrease sulphite concentration in the seawater to control levels of mercury release, emission and re-emission in both a produced treated flue gas and seawater effluent waste stream.

10. The system according to claim 7, wherein the seawater scrubber system parameter adjusted is an amount of oxidation air supplied to effluent seawater collected in the seawater scrubber system.

11. The system according to claim 7, further comprising: a valve controlled by the control device for adjusting an amount of fresh seawater supplied for nozzle dispersal within the seawater scrubber system.

12. The system according to claim 7, further comprising: a blower controlled by the control device for transporting an amount of oxidation air to the effluent seawater collected in the seawater scrubber system.

13. The system according to claim 7, further comprising:
   a valve for adjusting an amount of fresh seawater supplied to the seawater scrubber system and a blower adjustable to vary an amount of oxidation air supplied to effluent seawater collected in the seawater scrubber system to adjust the sulphite concentrations therein to control levels of mercury release, emission and/or re-emission in each the produced treated flue gas and the seawater effluent waste stream.

14. The system according to claim 7, wherein the control device includes a memory device.

* * * * *